April 1, 1969 MASANAGA KOBAYASHI 3,436,662

CONTROL SYSTEM FOR DEACTIVATING REMOTE TAPE RECORDER
IN ABSENCE OF AUDIO MODULATED SIGNAL
Filed March 20, 1967

Masanaga Kobayashi

INVENTOR.

BY George B. Oujevolk

Attorney

United States Patent Office 3,436,662

Patented Apr. 1, 1969

3,436,662

CONTROL SYSTEM FOR DEACTIVATING REMOTE TAPE RECORDER IN ABSENCE OF AUDIO MODULATED SIGNAL

Masanaga Kobayashi, Suginami-ku, Japan, assignor to Crown Radio Corporation, Tokyo, Japan, a corporation of Japan Filed Mar. 20, 1967, Ser. No. 624,551

Claims priority, application Japan, Mar. 22, 1966, 41/25,340

Int. Cl. H04b *13/00, 1/20, 1/02*

U.S. Cl. 325—66 4 Claims

ABSTRACT OF THE DISCLOSURE

A magnetic recording device comprising a wireless microphone system which radiates electromagnetic carrier waves modulated by the aural signals and a receiving and recording system which receives the modulated waves and records the aural information in a magnetic tape. The receiving and recording system includes a first relay energized by said modulated waves and a second relay energized by the aural signal component contained in the modulated wave, whereby only when said first and second relays are both energized the magnetic tape driving motor is energized to record the aural informations on the magnetic tape.

*Background of the invention*

The present invention relates to magnetic recording devices, and more particularly, to a magnetic recording device for recording aural signals transmitted by means of carrier waves from a location of a given distance apart.

In prior art magnetic recording system consisting of a transmitter which radiates modulated waves produced by amplitude or frequency modulation of carrier wave by aural signals and a magnetic recorder which is located a given distance apart from the transmitter, receives the modulated waves from the transmitter, demodulates the modulated wave to take out aural signal, and records the aural information on the magnetic tape. The magnetic tape of the recorder is continuously driven regardless of presence or absence of carrier waves from the transmitter. With such a recording device, however, magnetic tape is often wastefully driven away without making any recording and electric power is wastefully consumed to maintain the recording device always in a state ready for recording.

*Summary of the invention*

The object of this invention is to provide a magnetic recording device comprising a wireless microphone system consisting of a carrier generator which generates a carrier wave, a modulator where the carrier wave from the carrier generator is amplitude or frequency modulated by the aural signal, and means for radiating the modulated wave in the form of electromagnetic waves into the atmosphere, and a receiving and recording system including means for receiving and rectifying said modulated wave to produce a first DC signal, a first relay whose first normally open contact is closed when energized by the first DC signal, means for taking out the aural signal component from said modulated wave to produce a second DC signal, a signal storing circuit for storing said second DC signal, a second relay whose second normally open contact is closed when energized by the second DC signal supplied through said signal storing circuit, a magnetic tape driving motor which is connected in series with said first and second contacts and which is connected across the power source only when both of said contacts are closed, and means to record the aural signal on said magnetic tape.

In the magnetic recording device according to the invention, the magnetic tape of the recording is driven only when the aural signal is transmitted, so that wasteful use of magnetic tape and wasteful electric power consumption may be avoided. Thus, extremely economical magnetic recording device can be provided.

The invention will best be understood from the following description and appended claims.

*Detailed description*

Figure 1:
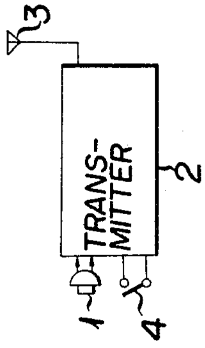
FIG. 1 is a schematic view of a wireless microphone system embodying the invention.

Referring to FIG. 1, there is schematically represented a wireless microphone system comprising a microphone 1 generating aural signals, a transmitter 2, an antenna 3, and a power source switch 4. The transmitter 2 includes, although not shown in the figure, a power source, a carrier generator and an amplitude modulator, whereby when the switch 4 is "on" state, the carrier wave generated by the carrier generator is amplitude modulated and the modulated wave is radiated as the electromagnetic wave from the antenna 3.

Figure 2:
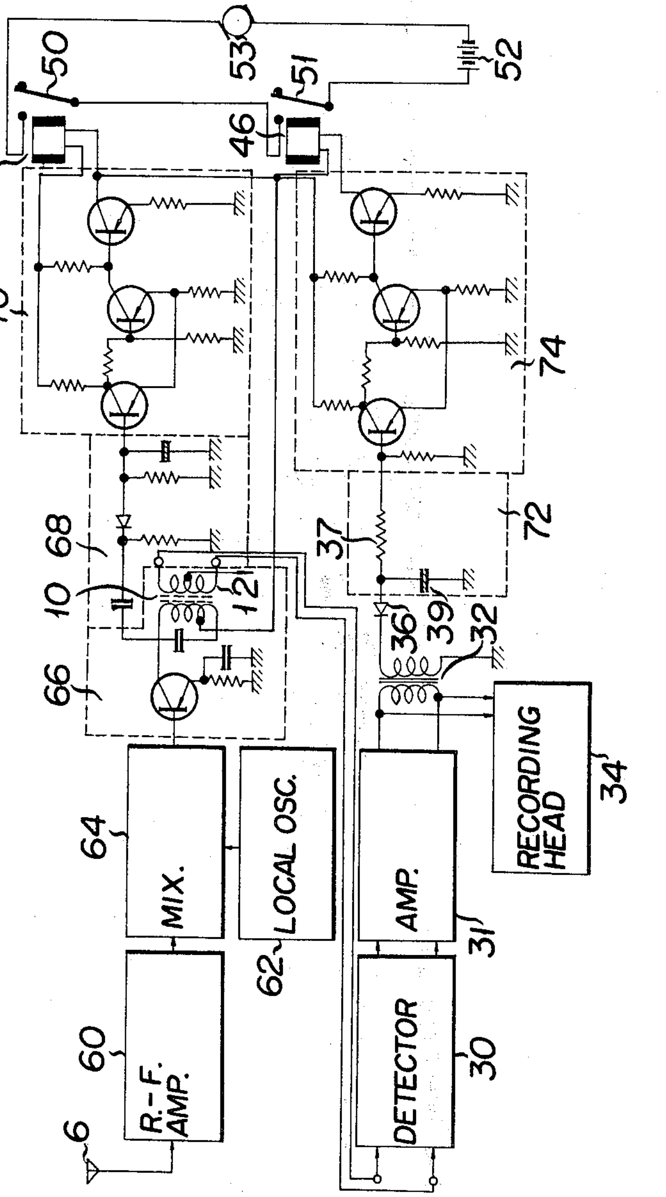
FIG. 2 is a circuit diagram illustrating connections of a receiving and recording system embodying this invention.

FIG. 2 illustrates a circuit arrangement for receiving and recording aural informations radiated from the wireless microphone system. The modulated wave received by an antenna 6 is amplified by a radio frequency amplifier 60, whose output is fed to a mixer 64 together with the output from the local oscillator 62 to be transformed into an intermediate frequency wave. The output from the mixer 64 is amplified through an intermediate frequency amplifying stage 66 shown as enclosed by a dashed line in the figure. The output from the intermediate frequency amplifying stage 66 is rectified and amplified through a rectifier 68 and a three-stage amplifier 70 respectively. The output from the amplifier 70 is applied across an exciting coil of a relay 26 having a contact 50 which is normally in "off" state.

The intermediate frequency amplifying stage 66, on the other hand, includes an intermediate frequency transformer 10 whose secondary winding is connected to input terminals of a detector 30. Through the intermediate frequency transformer 10 the modulated wave is fed to the detector 30 where the aural signal component contained in the modulated wave is taken out and which signal component is then amplified by a low-frequency amplifier 31. The amplified aural signal component is supplied to an exciting coil (not shown) of a magnetic recording head section 34, while at the same time it is rectified by a diode 36 through a transformer 32, and after passing a signal storing circuit 72 comprising a resistor 37 and a capacitor 39 it is amplified by a three-stage amplifier 74. The output terminal of the last stage of the amplifier 74 is connected to an exciting coil of a relay 46 having a normally open contact 51, to which exciting coil is applied only aural signal component of the modulated wave.

The contact 50 of the relay 26 and the contact 51 of the relay 46 are connected in series with the power line of a magnetic tape driving motor 53 across a DC power source 52. Accordingly, only when relays 26 and 46 are both energized, the motor 53 is driven to record aural signals on a magnetic tape not shown which is moved by keeping contact with the magnetic recording head section 34. In other words, when the carrier wave from the wireless microphone system contains modulated portions both the contacts 50 and 51 are closed to drive the magnetic tape driving motor 53 so as to make recording on the moving magnetic tape.

The aural signal is usually transmitted intermittently. However, even if there are short-period interruptions of presence of the aural signal, the relay 46 is not brought to the nonenergized state every time such interruption takes place as the time constant for resistor 37 and capacitor 39 of the signal storing circuit 72 is set to be large enough to prevent temporary break of the magnetic tape driving motor 53 for short-time interruption of the aural signal.

However, the allowable interval of time during which the magnetic tape driving motor 53 continues to be driven without being brought to a halt even with interruption of presence of the aural signal is very short, and once a predetermined time corresponding to the time constant as above referred to has been passed after the cessation of the aural signal, the relay 46 is changed to the nonenergized state, and the motor 53 is stopped, so that waste of electric power is extremely small and the magnetic tape may be used very efficiently and economically. The relay 26 is adapted to function with a continuous signal at above a certain level, that is a carrier component, so that it will never misfunction with noises. Also, when the power source switch 4 of the wireless microphone system is turned off, both the contacts 50 and 51 are returned to the open state and the recording operation ceases.

Although in the foregoing description the modulated wave from the wireless microphone system is passed to the intermediate frequency stage prior to passing to the rectifier 68 and the detector 30. However, it is also possible to feed the output from the radio frequency amplifier 60 to the rectifier 68 and to a terminal of the detector 30 without introducing it into the intermediate frequency stage. In this case the other terminal of the detector 30 should be grounded.

Further, the modulated wave transmitted from the wireless microphone system may be a frequency modulated wave. In this case the modulator for the wireless microphone system is a frequency modulator and the demodulator for the receiving and recording system should be a frequency discriminator. Such frequency modulator and frequency discriminator may be of usual type and therefore they are not illustrated.

While the invention has been disclosed with reference to the particular structure herein shown, it is not confined to the details and arrangement set forth, and this application is intended to cover such modifications or departures as may come within the scope of the appended claims.

What is claimed is:

1. A magnetic recording device comprising a wireless microphone system and a modulated wave receiving and recording system, said wireless microphone system including a carrier generator for generating a carrier wave, a modulator for modulating the carrier wave with aural signals, to produce modulated wave, and means to radiate the modulated wave as the electromagnetic wave into the atmosphere, and said modulated wave receiving and recording system including means for receiving and rectifying said modulated wave to produce a first DC signal, a first relay whose first normally open contact is closed when energized by the first DC signal, means for taking out the aural signal component from said modulated wave to produce a second DC signal, a signal storing circuit for storing said second DC signal, a second relay whose second normally open contact is closed when energized by the second DC signal supplied through said signal storing circuit, a magnetic tape driving motor which is connected in series with said first and second normally open contacts and which is connected across the power source only when both of said contacts are closed, and means to record the aural signal on said magnetic tape.

2. A magnetic recording device as claimed in claim 1 wherein said signal storing circuit comprises a resistor and a capacitor.

3. A magnetic recording device as claimed in claim 1 wherein said modulator is an amplitude modulator.

4. A magnetic recording device as claimed in claim 1 wherein said modulator is a frequency modulator.

References Cited

UNITED STATES PATENTS

| | | | |
|---|---|---|---|
| 2,191,277 | 2/1940 | George | 325—66 |
| 2,413,296 | 12/1946 | Deal et al. | 325—37 |
| 2,527,561 | 10/1950 | Mayle | 325—392 |
| 2,897,354 | 7/1959 | Bourget et al. | 325—392 XR |
| 3,165,595 | 1/1965 | Noshiro | 179—100.2 |
| 3,271,680 | 9/1966 | Reynolds | 325—37 |

ROBERT L. GRIFFIN, *Primary Examiner.*

ALBERT J. MAYER, *Assistant Examiner.*

U.S. Cl. X.R.

179—100.2; 325—37, 392; 343—226